US012767218B2

(12) United States Patent
Hambloch et al.

(10) Patent No.: US 12,767,218 B2
(45) Date of Patent: Oct. 20, 2026

(54) STEER-BY-WIRE STEERING SYSTEM AND METHOD

(71) Applicant: ZF Automotive Germany GmbH, Alfdorf (DE)

(72) Inventors: Peter Hambloch, Krefeld (DE); Martin Gebing, Vreden (DE)

(73) Assignee: ZF Automotive Germany GMBH, Alfdorf (DE)

( * ) Notice: Subject to any disclaimer, the term of this patent is extended or adjusted under 35 U.S.C. 154(b) by 559 days.

(21) Appl. No.: 18/329,673

(22) Filed: Jun. 6, 2023

(65) Prior Publication Data

US 2023/0399048 A1 Dec. 14, 2023

(30) Foreign Application Priority Data

Jun. 8, 2022 (DE) ........................... 10202220579.2

(51) Int. Cl.
*B62D 6/00* (2006.01)
*B62D 5/00* (2006.01)

(52) U.S. Cl.
CPC ............... *B62D 6/00* (2013.01); *B62D 5/001* (2013.01)

(58) Field of Classification Search
CPC . B62D 6/00; B62D 5/001; B62D 6/02; B62D 6/002
USPC ........................................................... 701/41
See application file for complete search history.

(56) References Cited

U.S. PATENT DOCUMENTS

| | | | | |
|---|---|---|---|---|
| 2020/0317219 A1* | 10/2020 | Yoshida | ............. | B62D 15/0255 |
| 2021/0070361 A1* | 3/2021 | Erickson | ............ | B62D 15/0235 |

FOREIGN PATENT DOCUMENTS

| | | | |
|---|---|---|---|
| DE | 10200612 | A1 | 7/2003 |
| DE | 102009014392 | A1 | 10/2009 |
| DE | 102009045046 | A1 | 3/2011 |
| DE | 102015005124 | A1 | 10/2016 |
| DE | 102018115329 | A1 | 1/2020 |
| DE | 102019214225 | A1 | 3/2021 |

* cited by examiner

*Primary Examiner* — Scott A Reinbold
(74) *Attorney, Agent, or Firm* — Kristin L. Murphy

(57) ABSTRACT

A steer-by-wire steering system for a vehicle is described, with a driver-operable control element for steering angle input, an actuating mechanism for setting a wheel setting angle, and with a control unit which is configured, on the basis of a steering angle of the control element and a vehicle speed, to output a map for the setpoint of a position of the actuating mechanism. A defined maximum steering angle is assigned to a maximum wheel setting angle. A method is also described for producing a map for the setpoint of a position of the actuating mechanism in a steer-by-wire steering system.

14 Claims, 1 Drawing Sheet

STEER-BY-WIRE STEERING SYSTEM AND METHOD

CROSS-REFERENCE TO RELATED APPLICATION

This application claims priority to German Priority Application No. 102022205792.9, filed Jun. 8, 2022, the disclosure of which is incorporated herein by reference in its entirety.

TECHNICAL FIELD

The disclosure concerns a steer-by-wire steering system for a vehicle and a method for producing a map for the setpoint of a position of the actuating mechanism for setting a wheel setting angle in a steer-by-wire steering system.

BACKGROUND

Steering systems usually comprise a toothed rack which is mounted linearly displaceably for adjusting a wheel setting. Originally, such a toothed rack is coupled to the steering wheel via a steering linkage, so that a linear movement of the toothed rack is achieved via a rotation of the steering wheel.

In modern motor vehicles, so-called steer-by-wire steering systems (SBW) are increasingly used in which there is no longer a mechanical connection between the steering wheel and the toothed rack. The movement of the toothed rack is achieved by an electric drive.

Theoretically, in steer-by-wire steering systems, any translation ratio of a steering angle to a wheel setting angle can be set. However, the physical travel path of the toothed rack or the travel path of the electric drive on the front axle is limited.

Accordingly, a maximum steering angle results from the maximum travel path of the actuating motor on the front axle in combination with the translation ratio of the steering angle to the wheel setting angle. In known solutions, the translation ratio is taken from two-dimensional look-up tables or conversion tables using the steering angle or vehicle speed. The resulting maximum steering angle is not therefore directly included in the design of the steering system.

However, there are applications in which a defined maximum steering angle is desired which, irrespective of travel situation, may not be exceeded without reducing the steering comfort.

What is needed is an improved steer-by-wire steering system and a method for setting a translation ratio in a steer-by-wire steering system.

SUMMARY

A steer-by-wire steering system for a vehicle is disclosed, with a driver-operable control element for steering angle input, an actuating mechanism for setting a wheel setting angle, and with a control unit which is configured, on the basis of a steering angle of the control element and a vehicle speed, to output a map for the setpoint of a position of the actuating mechanism, wherein a defined maximum steering angle is assigned to a maximum wheel setting angle.

From the map, a ratio can be established between a deflection of the control element and a wheel setting angle set by the actuating mechanism for various travel situations.

The ratio established by the map is a virtual ratio since there is no mechanical connection between the control element and the wheels. The virtual ratio thus replaces the mechanical translation ratio which is no longer present in the steer-by-wire steering system, and is therefore also described as a virtual translation ratio.

According to the disclosure therefore, for a defined maximum steering angle, there is always a defined maximum possible wheel setting angle. Between a steering angle of zero and the maximum steering angle, the virtual translation ratio varies depending on the travel situation.

The defined maximum possible wheel setting angle may, but need not, correspond to the physically possible maximum wheel setting angle.

The steering system according to the disclosure has the advantage that in a defined steering angle range, the entire possible defined wheel setting range is used. Thus a high steering comfort and good drivability of the vehicle are achieved in all travel speed ranges.

Also, the steering system according to the disclosure allows an intuitive and time-efficient application of characteristic curves, which are structured as evenly as possible, for the setpoint of the position of the actuating mechanism and hence also a position of a front axle and a wheel setting angle or trajectory of the vehicle.

The control element is, for example a conventional steering wheel, a control column, a flat polygonal steering wheel, a rotatable potentiometer or a joystick.

The maximum defined steering angle is usually +/−180°. Thus the steering system according to the disclosure is particularly suitable for so-called flat control elements, such as a control column or flat polygonal steering wheels in which multiple full rotations of the steering wheel are not provided but during travel the driver's hands remain in a recommended position, for example, the so-called "quarter-to-three" position on the control element.

The development of the ratio between a deflection of the control element and the wheel setting angle set by the actuating mechanism may be determined at least in regions by a polynomial function of the third degree, wherein the maximum steering angle and the defined maximum wheel setting angle are included in the polynomial function as influencing parameters. The development of the virtual translation ratio is thereby even. Instead of the maximum wheel setting angle, a position of the actuating mechanism at which the defined maximum wheel setting angle is present may also serve as an influencing parameter.

According to an exemplary arrangement, for a steering angle from zero to a defined speed-dependent steering angle, the ratio between a deflection of the control element and the wheel setting angle set by the actuating mechanism is constant, and the ratio is determined variably by the polynomial function only when the defined speed-dependent steering angle has been exceeded. The constant ratio, for example, the virtual translation ratio, is reflected by a linear portion of the characteristic curve. In the region in which the virtual ratio is variable, the curve at least mainly has a non-linear course. The defined speed-dependent steering angle lies for example between 5° and 10° depending on speed. This achieves the advantage that at relatively low speeds, the virtual translation ratio is direct around the central position of the steering element. In other words, in this steering angle range, a steering movement is amplified more at slow travel than at high travel speeds. Thus maneuvering the vehicle is comfortable.

For example, within the linear region, the ratio between a deflection of the control element and the wheel setting angle set by the actuating mechanism is determined by a speed-dependent amplification factor. The amplification factor amounts, for example, to between 0.8 and 2.0. In one exemplary arrangement, the amplification factor is between 0.95 and 1.85. The amplification factor relates either to an established virtual value or to a physical translation ratio, for example to a toothed rack movement per revolution of a pinion acting on the toothed rack. In other words, the amplification factor relates to a reference translation ratio within the steering system. By a speed-dependent amplification factor, the translation ratio can be defined easily in the linear region.

Alternatively, instead of the amplification factor, an absolute amount of the translation ratio may be applied.

The polynomial function may have a turning point in the steering range. This contributes to an even development of the virtual translation ratio in the polynomial region. In concrete terms, this avoids the virtual translation ratio only increasing slowly in a wide region of the steering angle range and rising rapidly only close to the maximum steering angle.

The steering range is the region between zero and the maximum steering angle.

The speed-dependent steering angle, up to which the ratio between a deflection of the control element and the wheel setting angle set by the actuating mechanism is constant, and/or the speed-dependent amplification factor and/or the position of the turning point, may be stored in a look-up table for different speeds. This allows a particularly rapid calculation of the translation ratio in the control unit.

According to one exemplary arrangement, at least two, and in an exemplary arrangement, at least five, and in yet a further exemplary arrangement, for example six travel speed support points are stored in the control unit, wherein the control unit is configured to calculate, for the travel speed support points, a curve of the ratio between the deflection of the control element and the wheel setting angle set by the actuating mechanism via the steering angle. As the travel speed support points for which the curve of the translation ratio is calculated are stored, the translation ratio is calculated precisely only for a limited number of vehicle speeds. Thus the required calculation capacity of the control unit can be significantly reduced.

In one exemplary arrangement, the control unit is configured to interpolate a setpoint for the actuating mechanism between the travel speed support points. In this way, a map for the respective vehicle speed can be established sufficiently precisely even with reduced calculation capacity.

The actuating mechanism may comprise a toothed rack or at least one electromotorized actuator. Both a toothed rack and an electromotorized actuator are suitable for setting a defined wheel setting angle.

For example, a separate electromotorized actuator may be provided for each wheel of a vehicle.

A method for producing a map for the setpoint of a position of the actuating mechanism for setting a wheel setting angle in a steer-by-wire steering system for a vehicle, wherein the map is produced by a control unit on the basis of a steering angle of a control element and a vehicle speed, such that a defined maximum steering angle is assigned to a defined maximum wheel setting angle.

As already explained in connection with the steering system, the method according to an exemplary arrangement achieves an advantage that an adaptable region within the entire possible wheel setting range is used in a defined steering angle range. Thus a high steering comfort and good drivability of the vehicle are achieved in all travel speed ranges.

The method may also be refined as previously described for the steering system or as indicated in the dependent claims for the steering system.

It is also conceivable that instead of the wheel setting angle, a trajectory of the vehicle may itself be used as a setpoint. The trajectory may be established by use of models for driving simulation.

BRIEF DESCRIPTION OF DRAWINGS

Further advantages and features of the disclosure arise from the following description and the drawings, to which reference is made. In the drawings.

DETAILED DESCRIPTION

Figure 1:
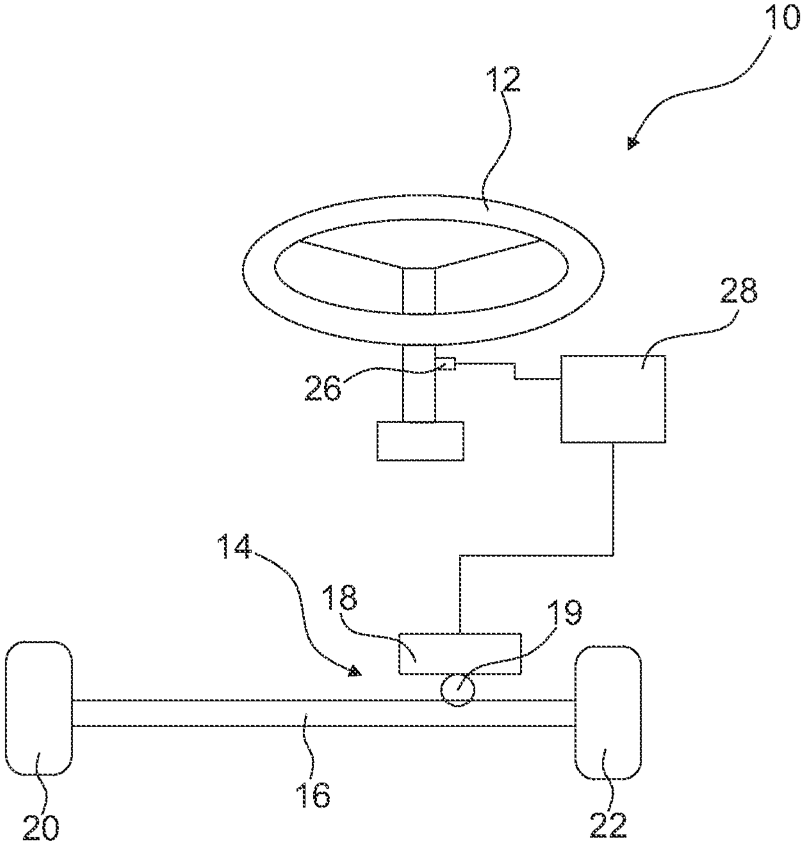
FIG. 1 shows schematically a steer-by-wire steering system according to an exemplary arrangement of the disclosure.

FIG. 1 illustrates schematically a steer-by-wire steering system 10 for a vehicle with a control element 12, which in this exemplary arrangement is a steering wheel.

The steering system 10 furthermore comprises an actuating mechanism 14.

In the exemplary arrangement illustrated, the actuating mechanism 14 comprises a toothed rack 16 and an actuating motor 18, wherein a mechanical translation mechanism—in this exemplary arrangement, implemented as a pinion 19—acts between the toothed rack 16 and the actuating motor 18. Alternatively, a recirculating ball screw or similar is also possible.

The toothed rack 16 forms a front axle which carries two front wheels 20, 22. The system may however also be used on a rear axle.

In an alternative exemplary arrangement which is not illustrated for the sake of simplicity, the actuating mechanism 14 comprises electromotorized actuators instead of a toothed rack 16 and a pinion 19, wherein an actuator is assigned to each wheel 20, 22.

In a steer-by-wire steering system 10, there is no mechanical coupling between the steering wheel 12 and the wheels 20, 22. Instead, a wheel setting angle is set by the actuating motor 18.

To this end, the pinion 19, which is in toothed engagement with the toothed rack 19, is rotated by the actuating motor 18, whereby the toothed rack 16 is moved linearly.

Starting from a neutral position, for example a maximum travel of +/−90 mm is set for the toothed rack 16.

The steering system 10 has a sensor 26, e.g. an angle sensor, which serves to detect a steering angle.

On the basis of the steering angle detected by the sensor 26, a signal is sent to an actuating motor 18.

More precisely, the steering system 10 has a control unit 28 which processes a value detected by the sensor 26 and sends a corresponding signal to the actuating motor 18.

In one exemplary arrangement, the control unit 28 is configured, on the basis of a steering angle of the control element 12 and a vehicle speed, to output a map for the setpoint of a position of the actuating mechanism 14. In concrete terms, a nominal position or state of the actuating motor 18 is predefined.

Here, a defined maximum steering angle is assigned to a defined maximum wheel setting angle. Accordingly, the wheel setting angle at the maximum steering angle is the same for every vehicle speed.

The maximum wheel setting angle is reached when the toothed rack 16 has covered its defined maximum travel.

The maximum travel of the toothed rack 16 is stored in the control unit 28 and can be applied to the steering system 10.

Figure 2:
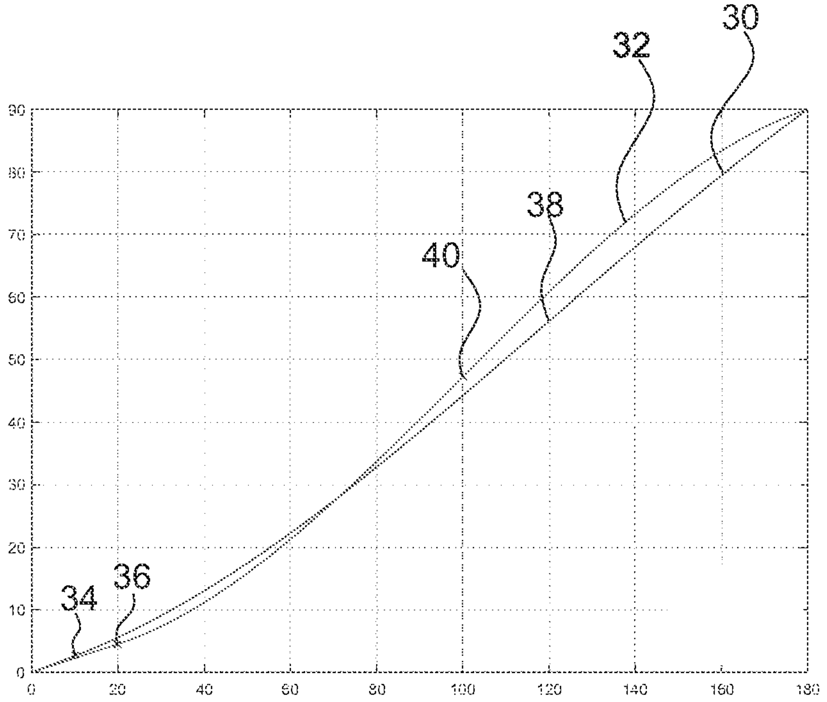
FIG. 2 shows the development of a toothed rack movement for different vehicle speeds.

FIG. 2 shows a graph of the toothed rack movement (Y axis) over the steering angle (X axis) for different vehicle speeds.

In FIG. 2, the line 30 illustrates a curve for a speed of 15 km/h and the line 32 illustrates a curve for a speed of 30 km/h.

It is clear from the different courses of the curves 30, 32 that for the different vehicle speeds, for a specific setting of the control element 12, different setpoints apply for a position of the actuating mechanism 14, i.e. different wheel setting angles, or in other words, different target values for the toothed rack travel within the steering angle range.

It is clear from FIG. 2 that the translation ratio is constant for a steering angle from zero up to a defined speed-dependent steering angle. For a vehicle speed of 15 km/h, the defined speed-dependent steering angle is around 10° (identified by point 34), and for a vehicle speed of 30 km/h it is 20° (identified by point 36).

In the linear region, the ratio between a deflection of the control element 12 and the wheel setting angle set by the actuating mechanism 14, i.e. the virtual translation ratio, is determined by a speed-dependent amplification factor. This leads to the different gradients of the curves 30, 32 in the respective linear region.

Alternatively, instead of the amplification factor, a concrete amount which varies according to speed may be selected for the virtual translation ratio.

In the remaining region, the development of the virtual translation ratio is determined by a polynomial function of the third degree. In other words, the virtual translation ratio is determined by the polynomial function when the defined speed-dependent steering angle is exceeded.

The polynomial functions each have a turning point 38, 40 in the steering range. For example, curve 30 has a turning point 38 at a steering angle of 120°, and curve 32 has a turning point 40 at a steering angle of 100°.

In concrete terms, the control unit 28 is configured to calculate the development of the ratio between a deflection of the control element 12 and the wheel setting angle set by the actuating mechanism 14, or a toothed rack position y as a function of the steering angle x, outside the linear region according to the following formula:

$$y(x)=a_3\cdot(x-x_1)^3+a_2\cdot(x-x_1)^2+a_1\cdot(x-x_1)+a_0$$

$x_1$ stands for the defined speed-dependent steering angle up to which the translation ratio is constant;

$a_1$ stands for the amplification factor in the linear region, $a_0$ is the product of the amplification factor in the linear region and the size of the linear region, $a_2$ is calculated according to the formula $a_2=3\cdot a_3\cdot(x_1-x_r)$, wherein $x_r$ describes the position of the turning points, $a_3$ is in turn calculated according to the formula:

$$a_3=\frac{y_m-a_1\cdot(x_m-x_1)-a_0}{(x_m-x_1)^3+3\cdot(x_1-x_r)\cdot(x_m-x_1)^2}$$

$x_m$ stand for the maximum steering angle and $y_m$ for a maximally deflected position of the toothed rack 16.

The maximum steering angle and the maximum wheel setting angle are accordingly included in the polynomial function as influencing parameters.

In the exemplary arrangement, the maximum steering angle is +/−180°.

In one exemplary arrangement, all influencing parameters are speed-dependent.

For example, several travel speed support points are stored in the control unit 28, i.e., 15 km/h, 30 km/h, 50 km/h, 70 km/h, 100 km/h and 150 km/h.

The control unit 28 is configured to calculate precisely the map for the setpoint of a position of the actuating mechanism 14, or in other words a development of the virtual translation ratio or a position of the toothed rack 16, via the steering angle according to the above-mentioned formula.

For the other speeds between the travel speed support points, the control unit 28 may interpolate the setpoint of a position of the actuating mechanism 14.

The speed-dependent steering angle up to which the virtual translation ratio is constant, and/or the speed-dependent amplification factor, and/or an established value for the virtual translation ratio, and/or the position of the turning point, may be stored in a look-up table for different speeds, wherein the speeds correspond to the travel speed support points. This simplifies calculation of the translation ratio.

The described steering system 10 is particularly suitable for performing a method for producing a map for the setpoint of a position of the actuating mechanism 14 for setting a wheel setting angle in a steer-by-wire steering system 10 for a vehicle, wherein the map is produced by the control unit 28 on the basis of a steering angle of a control element 12 and a vehicle speed, such that a defined maximum steering angle is assigned to a maximum wheel setting angle.

The invention claimed is:

1. A steer-by-wire steering system for a vehicle, comprising:

a driver-operable control element for steering angle input, an actuating mechanism configured to physically set a wheel setting angle of at least one wheel of the vehicle, a control unit operatively coupled to the control element and the actuating mechanism, the control unit being configured to:

determine, based on a steering angle of the control element and a detected vehicle speed, a speed-dependent map defining a setpoint position of the actuating mechanism, wherein the map defines a non-linear relationship between the steering angle and the wheel setting angle such that a defined maximum wheel setting angle of the actuating mechanism independent of vehicle speed, wherein, for steering angles exceeding a speed-dependent threshold steering angle, the non-linear relationship is determined by a third-degree polynomial function that includes the defined maximum steering angle and the defined maximum wheel setting angle as influencing parameters, and wherein the control unit outputs the set point position to the actuating mechanism to physically move the actuating mechanism and set the wheel setting angle during vehicle operation.

2. The steering system as claimed in claim 1, wherein development of a ratio between a deflection of the control element and the wheel setting angle set by the actuating mechanism is determined at least in regions by the third-degree polynomial function.

3. The steering system as claimed in claim 2, wherein within a linear region, the ratio between a deflection of the control element and the wheel setting angle set by the actuating mechanism is determined by a speed-dependent amplification factor.

4. The steering system as claimed in claim 2, wherein the polynomial function has a turning point in the steering range.

5. The steering system as claimed in claim 2, wherein the speed-dependent steering angle, up to which the ratio between a deflection of the control element and the wheel setting angle set by the actuating mechanism is constant, and/or the speed-dependent amplification factor and/or the position of the turning point, are stored in a look-up table for different speeds.

6. The steering system as claimed in claim 1, wherein at least two travel speed support points are stored in the control unit, wherein the control unit is configured to calculate, for the travel speed support points, a curve of the ratio between a deflection of the control element and the wheel setting angle set by the actuating mechanism via the steering angle.

7. The steering system as claimed in claim 6, wherein the control unit is configured to interpolate a curve of the ratio between a deflection of the control element and the wheel setting angle set by the actuating mechanism between the travel speed support points.

8. The steering system as claimed in claim 1, wherein the actuating mechanism comprises a toothed rack or at least one electromotorized actuator.

9. A method for producing a map for a setpoint of a position of an actuating mechanism in a steer-by-wire steering system for a vehicle, comprising:

detecting a steering angle of a driver-operable control element and a vehicle speed;

generating, by a control unit, a speed-dependent map defining a relationship between the steering angle and a wheel setting angle of the vehicle, wherein the map defines a non-linear relationship such that a defined maximum steering angle is assigned to a defined maximum wheel setting angle independent of vehicle speed, and wherein the non-linear relationship is defined at least in part by a third-degree polynomial function including the defined maximum steering angle and the defined maximum wheel setting angle as influencing parameters; and outputting by the control unit, a setpoint position of the actuating mechanism based on the map to physically actuate the actuating mechanism and set the wheel setting angle of the vehicle during driving.

10. The steering system as claimed in claim 2, wherein the polynomial function has a turning point in the steering range.

11. The steering system as claimed in claim 3, wherein the speed-dependent steering angle, up to which the ratio between a deflection of the control element and the wheel setting angle set by the actuating mechanism is constant, and/or the speeddependent amplification factor and/or the position of the turning point, are stored in a look-up table for different speeds.

12. The steering system as claimed in claim 5, wherein at least five travel speed support points are stored in the control unit, wherein the control unit is configured to calculate, for the travel speed support points, a curve of the ratio between a deflection of the control element and the wheel setting angle set by the actuating mechanism via the steering angle.

13. The steering system as claimed in claim 12, wherein the control unit is configured to interpolate a curve of the ratio between a deflection of the control element and the wheel setting angle set by the actuating mechanism between the travel speed support points.

14. The steering system as claimed in claim 13, wherein the actuating mechanism comprises a toothed rack or at least one electromotorized actuator.

* * * * *